United States Patent [19]

Gandiglio

[11] Patent Number: 4,957,307
[45] Date of Patent: Sep. 18, 1990

[54] SUSPENSION FOR THE FRONT STEERED WHEELS OF A MOTOR VEHICLE

[75] Inventor: Romolo Gandiglio, Cambiano, Italy

[73] Assignee: Fiat Auto S.P.A., Turin, Italy

[21] Appl. No.: 371,920

[22] Filed: Jun. 27, 1989

[30] Foreign Application Priority Data

Jul. 11, 1988 [IT] Italy .............................. 67648 A/88

[51] Int. Cl.⁵ ............................................ B60K 17/30
[52] U.S. Cl. ...................................... 280/666; 280/690
[58] Field of Search .............. 280/666, 667, 676, 696, 280/701, 724

[56] References Cited

U.S. PATENT DOCUMENTS

| | | | |
|---|---|---|---|
| 4,170,373 | 10/1979 | Beck et al. | 208/666 |
| 4,358,831 | 9/1985 | Kami et al. | 280/696 |
| 4,753,455 | 6/1988 | Murakami et al. | 280/696 |
| 4,878,688 | 11/1989 | Kubo | 280/666 |

*Primary Examiner*—Kenneth R. Rice
*Attorney, Agent, or Firm*—Fitch, Even, Tabin & Flannery

[57] ABSTRACT

An articulated quadrilateral suspension for the front steered wheels of a motor vehicle includes a vertical articulation arm rigidly connected to the fork-shaped wheel support by two separate elements which are spaced apart in a substantially longitudinally direction. The ends of the articulation arm are articulated to respective pivoting arms which are in turn articulated to the body of the vehicle. A shock-absorber with a coaxial helical spring is arranged substantially vertically adjacent the articulation arm, with its upper end connected to the body and its lower end articulated to the lower pivoting arm.

1 Claim, 1 Drawing Sheet

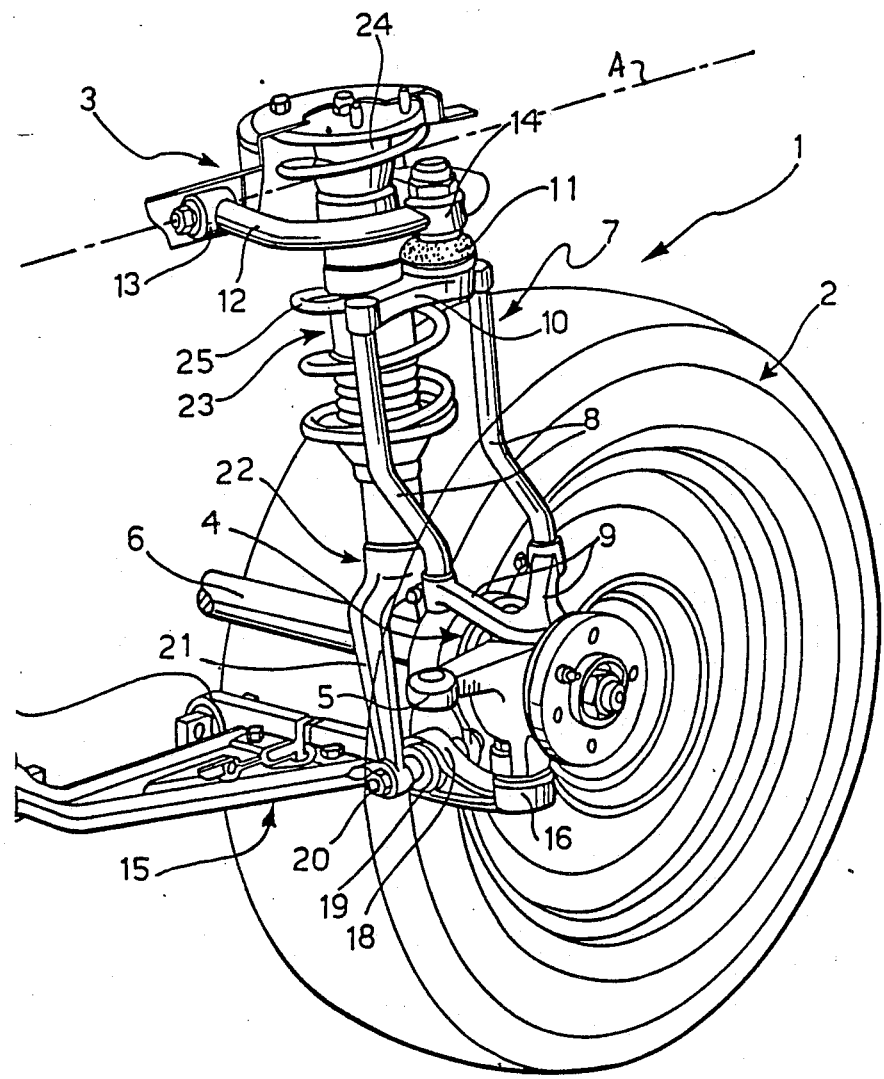

SUSPENSION FOR THE FRONT STEERED WHEELS OF A MOTOR VEHICLE

DESCRIPTION

The present invention relates to a suspension for the front steered wheels of a motor vehicle of the articulated quadrilateral type. The invention more particularly concerns a suspension of the type comprising:

a wheel provided with a wheel support, an articulation arm rigidly connected to the support and extending substantially vertically, an upper arm articulated at one end to the frame about an axis substantially parallel to the longitudinal axis of the vehicle and at the other end to the upper end of the articulation arm, a lower arm articulated at one end to the frame about an axis substantially parallel to the longitudinal axis of the vehicle and at the other end to the lower end of the wheel support, and a shock-absorber with a coaxial helical spring arranged substantially vertically, with its upper end fixed to the frame and its lower end articulated to the lower arm.

A suspension of the type defined above is described in French patent No. 2 536 345.

The object of the present invention is to provide a suspension of the type defined above, which, as well as having excellent dynamic behavior, is also compact transversely.

According to the present invention, this object is achieved by virtue of the fact that the articulation arm is fork-shaped with two separate elements which are spaced apart in a substantially longitudinal direction.

By virtue of this characteristic, it is possible to arrange the shock-absorber substantially vertically and in close proximity to the articulation arm. A reduction in the transverse bulk of the suspension and a consequent increase in the space available within the engine compartment are thus achieved.

Further characteristics and advantages of the present invention will become clear from the detailed description which follows with reference to the appended drawing, provided purely by way of non-limiting example, which shows a perspective view of a suspension according to the present invention.

In the drawing, a suspension for a front steered wheel 2 of a motor vehicle is generally indicated 1. The embodiment illustrated relates to the application of the suspension according to the invention to a driving wheel. The unitised body of the vehicle, shown partially in the drawing, is indicated 3.

The wheel 2 is provided with a wheel support 4 with an integrally-formed steering lever 5 which is articulated at its end to a steering tie rod (not illustrated). The wheel 2 receives the drive through a transmission drive-shaft 6.

The support 4 is fixed rigidly to a vertical articulation arm, generally indicated 7. The arm 7 is constituted by two shaped elements 8 which are spaced apart and contained substantially within a longitudinal vertical plane. The lower ends of the elements 8 are fixed to respective appendages 9 formed integrally with the upper part of the support 4. The upper ends of the elements 8 are fixed to an arcuate body 10. The central part of the body 10 carries the head of a ball joint 11 which articulates the vertical arm 7 to an upper pivoting arm 12. The upper arm 12 is U-shaped and its ends are articulated to the body 3 about an axis A, substantially parallel to the longitudinal axis of the vehicle, by means of two resilient bushes 13. The central part of the arm 12 has a projection 14 with a hole through which the rod of the joint 11 passes.

The suspension 1 is provided with a lower pivoting arm 15 of generally triangular shape. The lower arm 15 is arranged with one side parallel to the longitudinal axis of the vehicle and with the vertex opposite that side articulated to the lower part of the wheel support 4 by means of a ball joint 16. The longitudinal side of the lower arm 15 is articulated to the body 3 by means of two resilient bushes 17. Near the outer vertex, the lower arm 15 has a projection 18 within which a resilient bush 19 with a longitudinal axis is arranged. A shaft 20 passes through the bush 19 and its ends are connected to two spaced parts 21 (only one of which is visible in the drawing) of a fork-shaped element 22. The upper part of the fork-shaped element 22 is connected to the lower end of a shock-absorber 23 which is arranged substantially vertically. The space between the two spaced parts 21 of the fork-shaped element 22 is used for the passage of the transmission drive-shaft 6.

The upper part of the shock-absorber 23 is connected to the body 3 with the interposition of a resilient support 24. In known manner, a helical spring 25 is arranged coaxially with the shock-absorber 23. The upper end of the spring 25-shock-absorber 23 assembly is situated in the space between the body 3 and the inner end of the upper pivoting arm 12.

The arrangement described above enables particularly good dynamic characteristics to be achieved, since the wheel 2 is constrained to move in a plane substantially parallel to the longitudinal median plane of the vehicle, its suspension movement being guided by the articulation arm 7. Moreover, the particular shape of the articulation arm 7 enables the shock-absorber 23-spring 25 assembly to be situated in close proximity to the articulation arm, entirely to the benefit of the space available in the engine compartment.

I claim:

1. A suspension for the front steered wheels of a motor vehicle, having a frame with a longitudinal axis, comprising:

a wheel provided with a wheel support, an articulation arm rigidly connected to the support and extending substantially vertically, an upper arm articulated at one end to the frame about an axis substantially parallel to the longitudinal axis of the vehicle and at the other end to the upper end of the articulation arm, a lower arm articulated at one end to the frame about an axis substantially parallel to the longitudinal axis of the vehicle and at the other end to the lower end of the wheel support and a shock-absorber with a coaxial helical spring arranged substantially vertically, with its upper end fixed to the frame and its lower end articulated to the lower arm, wherein the articulation arm is fork-shaped with two separate elements which are spaced apart in a substantially longitudinal direction.

* * * * *

UNITED STATES PATENT AND TRADEMARK OFFICE
CERTIFICATE OF CORRECTION

PATENT NO. : 4,957,307
DATED : September 18, 1990
INVENTOR(S) : Romolo Gandiglio It is certified that error appears in the above-identified patent and that said Letters Patent is hereby corrected as shown below:

On the title page, of the Patent in the residence listing for the Assignee, change "Turin" to --Torino--.

On the title page the Patent under "References Cited", change Reference "4,358,831" to --4,538,831--.

On the title page of the Patent in line 5 of the Abstract, change "longitudinally" to --longitudinal--.

Column 1, line 8, insert a paragraph break before the sentence beginning "The invention more particularly . . . ".

Signed and Sealed this

Twenty-eighth Day of April, 1992

Attest:

HARRY F. MANBECK, JR.

*Attesting Officer*  *Commissioner of Patents and Trademarks*